(12) United States Patent
Mattioli et al.

(10) Patent No.: US 11,985,057 B1
(45) Date of Patent: May 14, 2024

(54) SHIFTING OF NETWORK TRAFFIC USING CONVERGED PRIMARY AND SECONDARY PATHS IN A NETWORK DEVICE

(71) Applicant: Amazon Technologies, Inc., Seattle, WA (US)

(72) Inventors: Pier Maria Mattioli, Dublin (IE); Japson Jeyasekaran, Dublin, CA (US); Stephen Callaghan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 17/364,234

(22) Filed: Jun. 30, 2021

(51) Int. Cl.
*H04L 12/707* (2013.01)
*H04L 45/00* (2022.01)
*H04L 45/74* (2022.01)

(52) U.S. Cl.
CPC .............. *H04L 45/22* (2013.01); *H04L 45/74* (2013.01)

(58) Field of Classification Search
CPC .................................. H04L 45/22; H04L 45/74
See application file for complete search history.

(56) References Cited

U.S. PATENT DOCUMENTS

| 2016/0241463 | A1* | 8/2016 | D'Souza | H04L 45/22 |
| 2016/0248657 | A1* | 8/2016 | Kasiviswanathan | H04L 45/02 |
| 2022/0224629 | A1* | 7/2022 | Mada | H04L 45/245 |
| 2022/0239588 | A1* | 7/2022 | Malhotra | H04L 47/17 |
| 2023/0035009 | A1* | 2/2023 | Chen | H04L 45/566 |

* cited by examiner

*Primary Examiner* — Walli Z Butt
(74) *Attorney, Agent, or Firm* — Klarquist Sparkman, LLP (57) ABSTRACT

To achieve impact-less re-routing of traffic towards non best-paths in a network, two locator routes are originated for each network fabric: a primary locator and a secondary locator. In a steady state, the forwarding state on each router is created by recursion of endpoints identifiers through their originating location's primary locator-route. Secondary locator routes are not used in the steady state. At a desired point, a steering route is injected into the network device to redirect routing from the primary locator route to the secondary locator route. The secondary locator route has a different resultant port from the primary locator route to redirect incoming packets on a different network path.

20 Claims, 8 Drawing Sheets

SHIFTING OF NETWORK TRAFFIC USING CONVERGED PRIMARY AND SECONDARY PATHS IN A NETWORK DEVICE

BACKGROUND

Traffic on the Internet has grown dramatically over the last decade and continues to grow. Routers play a critical role in sustaining that growth. Various protocols exist for routers to communicate together. Typically, the protocols allow routers to identify neighbors and costs associated with routing packets to those neighbors. Such information allows the routers to collectively construct a topology map and to select an optimal route for forwarding network packets. Open Shortest Path First (OSPF) and Border Gateway Protocol (BGP) are examples of routing protocols for Internet Protocol networks.

In some cases, for maintenance or other reasons, it is necessary to shift traffic away from a router, a group of routers, or a path connecting the routers. Such traffic shifting is often manually accomplished with no set techniques established. More efficient traffic-shift options are needed.

DETAILED DESCRIPTION

The embodiments described herein relate to shifting traffic away from one or more network devices or paths. In some instances, it is desirable to remove one or more network devices (e.g., routers, switches, bridges, hubs, etc.) from a network for the purposes of maintenance, updates, replacements, etc. Path vector protocols, such as the Border Gateway Protocol (BGP), are used for sharing networks routing information between distinctly administered network domains (often referred to as "fabrics" or "autonomous systems"). In such protocols, each router at the boundaries of a given autonomous domain receives path vector messages from the adjacent domains, verifies these path attributes against its routing policies, updates its internal routing table, and finally produces new path vector messages to advertise the reachability information to other neighboring nodes. With a path vector protocol, each router lacks a complete view of the network topology interconnecting all autonomous domains beyond its directly connected neighbors. As consequence, any topology change triggers the routing protocols to start path exploration/hunting hop by hop, involving a potentially large number of alternatives before converging on new stable paths. This phase of routing instability between fabrics (i.e. autonomous network domains) leads to traffic loss, congestion, and ultimately has complex reaction chains hard to predict and mitigate effectively.

To achieve impact-less re-routing of traffic towards non best-paths, two locator routes are originated for each fabric: a primary locator and a secondary locator. Locator routes are topologically assigned to network attachment points (locations) and are amenable to aggregation. In a steady state, the forwarding state on each router is created by recursion of endpoint identifiers through their originating location's primary locator-route. The endpoint identifiers are routes assigned independently from the network topology and aggregated by the locator. Secondary locator routes are not used in the steady state. At a desired point, a steering route is injected into a Routing Information Base (RIB) of a network device to redirect routing from the primary locator route to the secondary locator route. The steering route is an indirect route whose next hop is an address to be resolved by another route. The secondary locator route has a different resultant port from the primary locator route to redirect incoming packets onto a different path.

Figure 1:
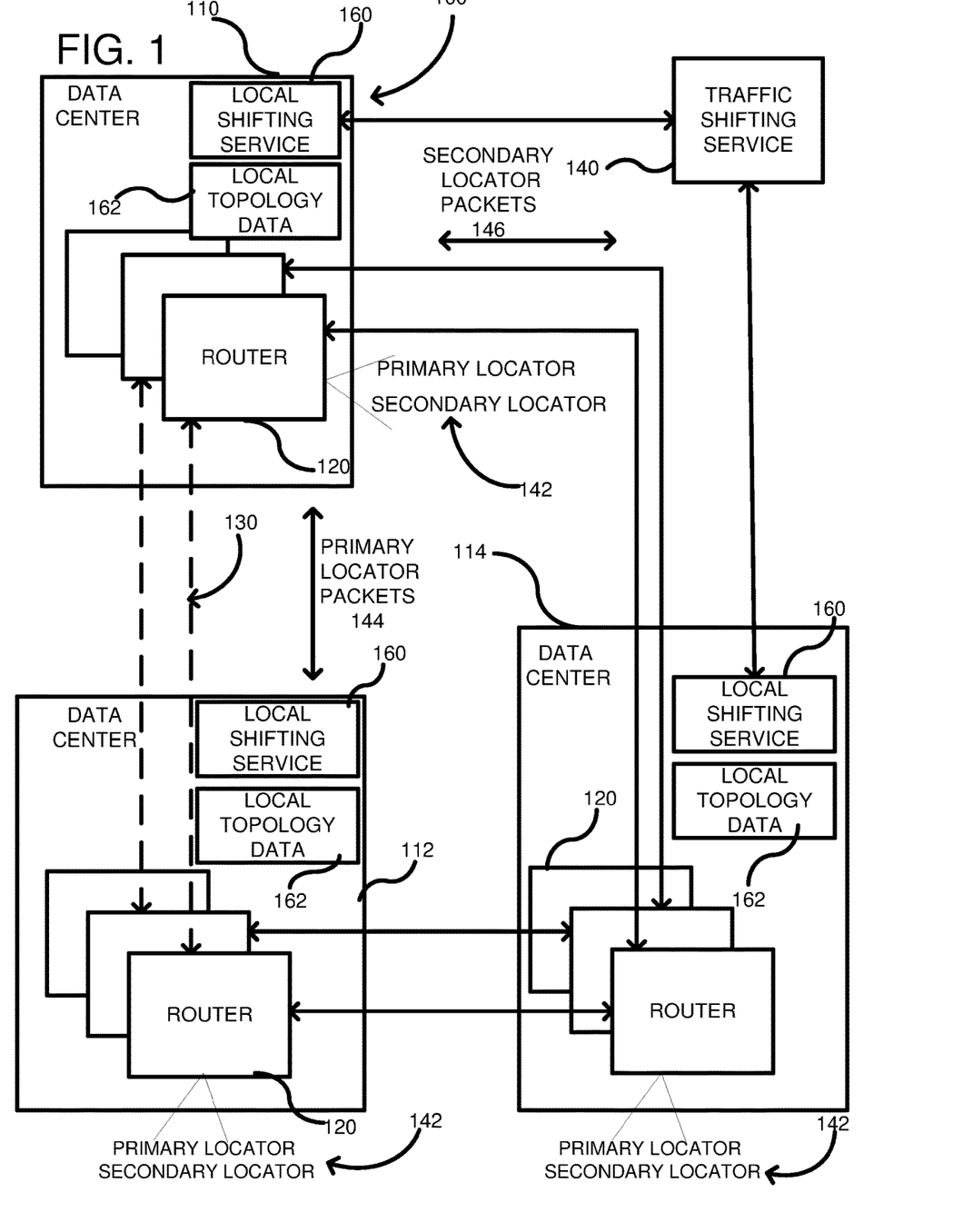
FIG. 1 is a system including a traffic shifting service to shift traffic from a first path to an alternative path between data centers.

FIG. 1 shows a system diagram of a network 100 with three different data center locations 110, 112, 114, although there are many additional data centers not shown. In this example, each data center includes a plurality of routers, shown generally at 120. The data center 110 is coupled via one or more links 130 to the data center 112. The links can include a physical cable (e.g., fiber optic) and any supporting software needed to establish a communication channel (together, herein generically called a "path"). In some cases, it is desirable to remove the links 130 and re-route traffic destined for data center 112 through the different data center 114. In this case, the removed links are shown as dashed lines, while solid lines indicate that links are active. In order to remove links, a traffic shifting service 140 directs the data centers 110, 112, 114 to switch network traffic by swapping from a primary locator route to a secondary locator route, both of which are shown generally at 142. The primary locator route directs packets between data centers 110, 112, as shown at 144, whereas the secondary locator route directs packets between data centers 110, 114, as shown at 146. Both the primary locator route and secondary locator route can be associated with a same prefix and are directing traffic to a same destination, but via different routes. Additionally, both the primary and secondary locator routes are announced to all network routers 120 so that convergence occurs prior to any shifting of network traffic. The traffic shifting service 140 can communicate with local shifting services 160 within each data center 110, 112, 114. Additionally, local topology data 162 in each data center can be read by the traffic shifting service 140 to make decisions in how to re-route traffic through the network. To swap from the primary locator route to the secondary locator route, the traffic shifting service 140 directs the local shifting services 160 to inject a steering route into the RIB of each router. As convergence already occurred on all secondary locator paths, the switch from the primary to the secondary locator routes will not be affected by performances and side effects of the underlying network routing protocol.

Figure 2:
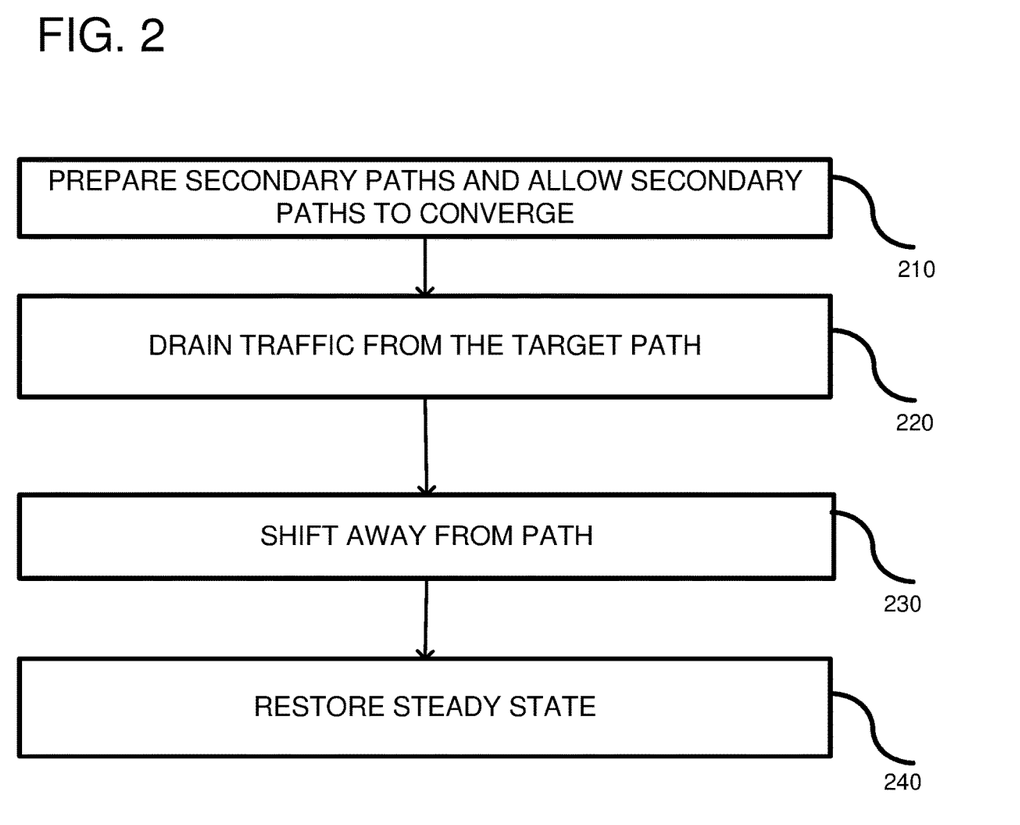
FIG. 2 is a flowchart according to one embodiment for shifting traffic away from a path in a network.

FIG. 2 is a flowchart according to one embodiment to shift network traffic away from a network path. In process block 210, secondary paths are announced and allowed to converge. In a steady state, all packets are resolved via primary locator routes. A pre-path shift routing policy is applied to both sides of a target path, selectively filtering out all secondary locator routes and causing the secondary paths to converge to a residual topology. The pre-path shift routing policy is used prior to the operation that shifts traffic off of the target path. Network traffic on the primary locator routes is unaffected. In process block 220, network traffic is drained from the target path. In order to drain the traffic from the target-path, the system iterates across the entire network location after location, steering the traffic to paths determined by the secondary locator routes. Local controllers (see FIG. 1 at 160) detect, at each node, where there is a difference between the primary and secondary locator routes next-hops and steer the traffic towards the secondary locator routes by injecting a steering route. The steering route is only shared locally for the device and not announced to neighbors. The prefix of the steering route is a subnet of the primary-locator route that best matches the next-hop address of endpoint identifying route, its next-hop address is best matched by the secondary locator route. As a result, the endpoint identifier routes originated at the target location are reprogrammed towards the secondary locator routes. Such a steering solution allows for steering traffic incrementally, reducing complexity and preserving the dynamic routing attributes of the endpoint identifier routes. Once the steering is complete, the steering route is injected to all remaining devices in the network to avoid transient path-hunting and ECMP groups shrinking due to first/last router converging the primary locator. Thereafter, all the traffic destined for the target location follows the secondary locator route and the primary locator route is not used. In process block 230, shifting away from the path occurs. After validating that no traffic is carried over the target paths, the target path is shut causing all primary locator routes to converge around the target path. In process block 240, the steady state is restored. After all local controllers validate that the primary locator routes match their secondary locator routes across the network, steering routes can be removed from the network and routers can revert to their steady-state routing policy.

Figure 3:
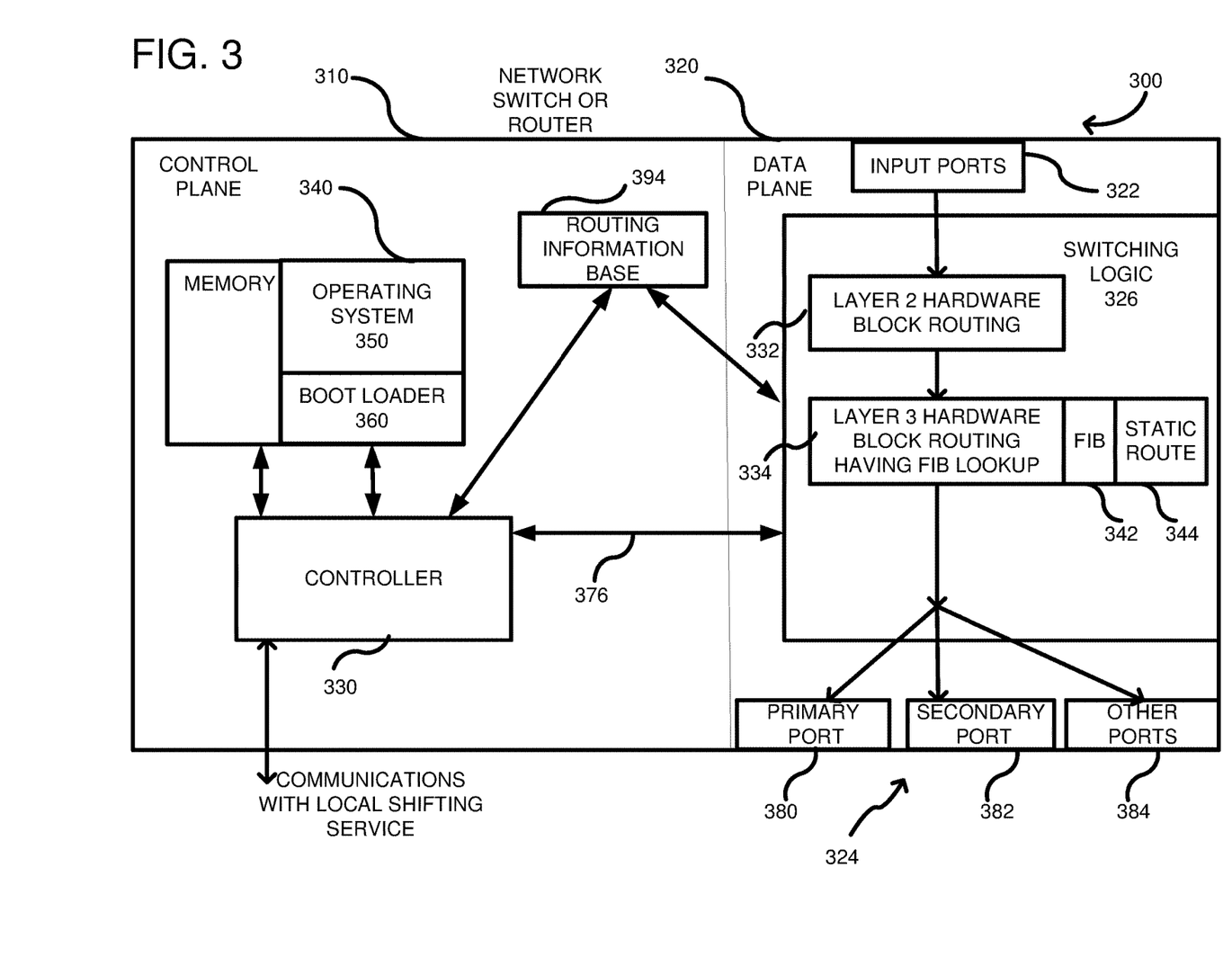
FIG. 3 is a network device with switching logic that is programmed to shift traffic from a primary port to a secondary port.

FIG. 3 is an embodiment of the network device 300 that is used for forwarding packets to neighbor network devices. The network device 300 includes a control plane 310 and a data plane 320. The control plane 310 is generally a management layer for configuring, updating, and controlling the data plane 320. The control plane includes a controller 330, which can be a Central Processing Unit (CPU), processor, application-specific integrated circuit (ASIC), microcontroller, or any hardware logic that can receive packets and provide switch management and control in response thereto. The controller 330 has access to a memory 340 that can be a Dynamic Random-Access Memory (DRAM), Flash memory, or other type of RAM or ROM.

The memory 340 is used to store an operating system 350 for the network device 300. The memory 340 may also include a boot loader program 360, which is a first program executed after a reboot of the controller 330, and which can run basic hardware tests before booting up the operating system 350. Although a single memory is shown, the memory 340 can be divided into multiple memories and even memories of different types. A communications bus 376 allows communications between the controller 330 and the data plane 320. The communications bus 376 can be any desired bus type, such as PCI, PCIe, AGP, etc. The data plane 320 includes input ports 322 and output ports 324 used for receiving and sending network packets, respectively.

Switching logic 326 is positioned between the input ports 322 and the output ports 324, which are typically adapted to receive network cables, such as Ethernet cables and optical fiber. The switching logic 326 can be a single ASIC integrated circuit or divided into multiple integrated circuits. The switching logic 326 can include multiple different hardware logic blocks including a Layer 2 hardware block 332 and a Layer 3 hardware block 334. The layer 2 hardware block 332 relates to an Ethernet layer and can forward packets based on MAC tables. The layer 3 hardware block 334 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a Forwarding Information Base (FIB) 342, which includes destination addresses for packets being transmitted through the switching logic. A programmed static route 344 can have priority over the FIB and can be used by the controller 330 to program the switching logic 326 and change the next hop to point to the secondary locator route. The network device 300 can run routing protocols, such as an Open Shortest Path First (OSPF) or a Routing Information Protocol (RIP), to communicate with other Layer 3 switches or routers. Whether it be the FIB or the static routes, the layer 3 hardware is used to lookup the route for an incoming packet. The different hardware blocks can be coupled in series and additional hardware blocks can be added based on the design.

The controller 330 can use one or more routing information bases (RIB) 394 to generate information needed to program the layer 3 hardware 334. Different routing protocols such as BGP, IS-IS, OSPF, as well as static routes can be merged together to generate the RIB 394. The controller 330 can further inject the static routes 344 into the switching logic. In one example, the primary locator route can result in packets being transmitted on a primary port 380, whereas the secondary locator route can result in packets being transmitted on the secondary port 382. Other ports 382 can also be used. Thus, when the injection of the static route occurs, the result is that packets previously destined for port 380 are switched to port 382. In some embodiments, static routes need not be used. Instead, the injection of the route can be programmed into the RIB at the BGP level and then transferred to the FIB 342 like other routes.

Figure 4:
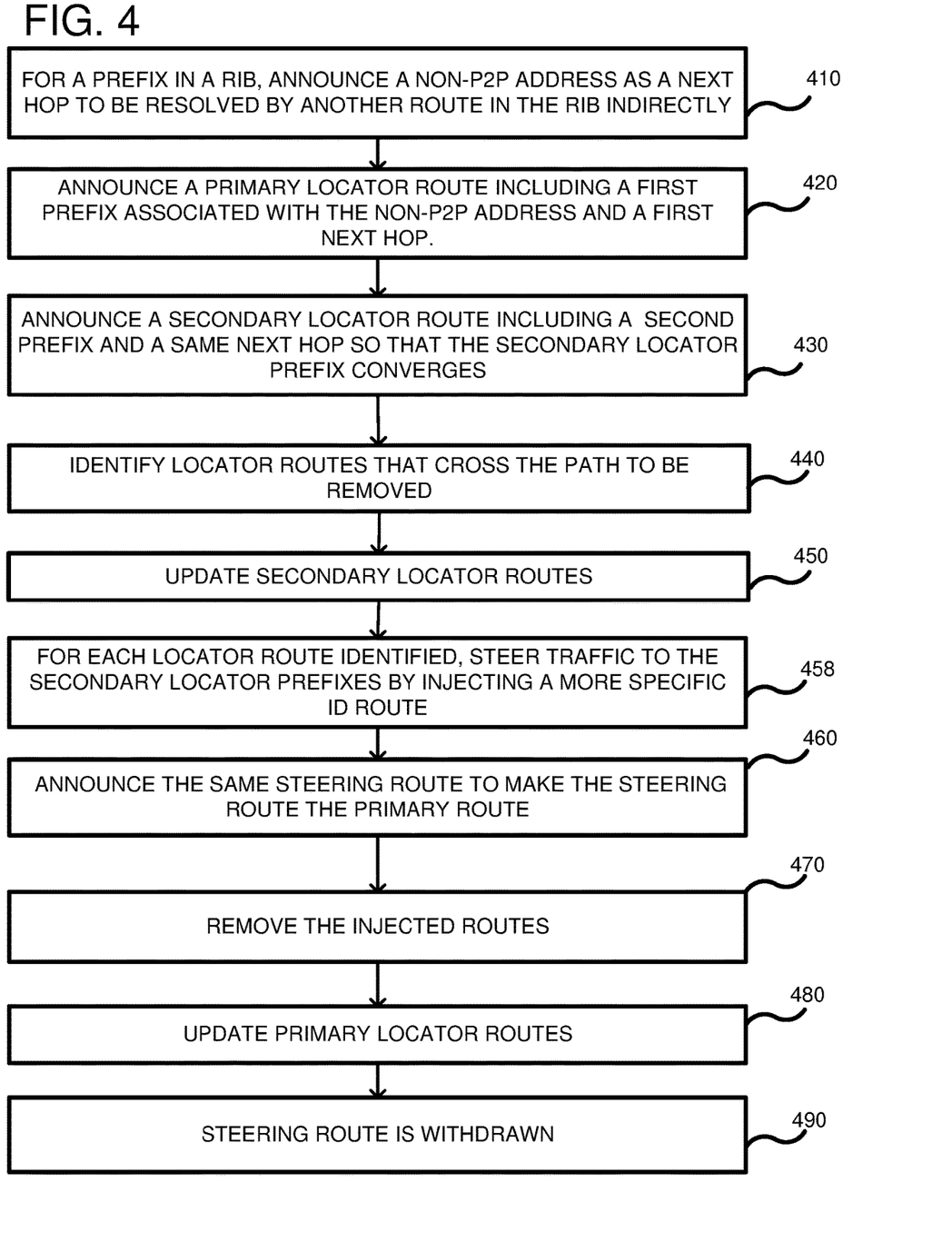
FIG. 4 is a flowchart according to another embodiment for shifting traffic away from a path in a network.
Figure 5:
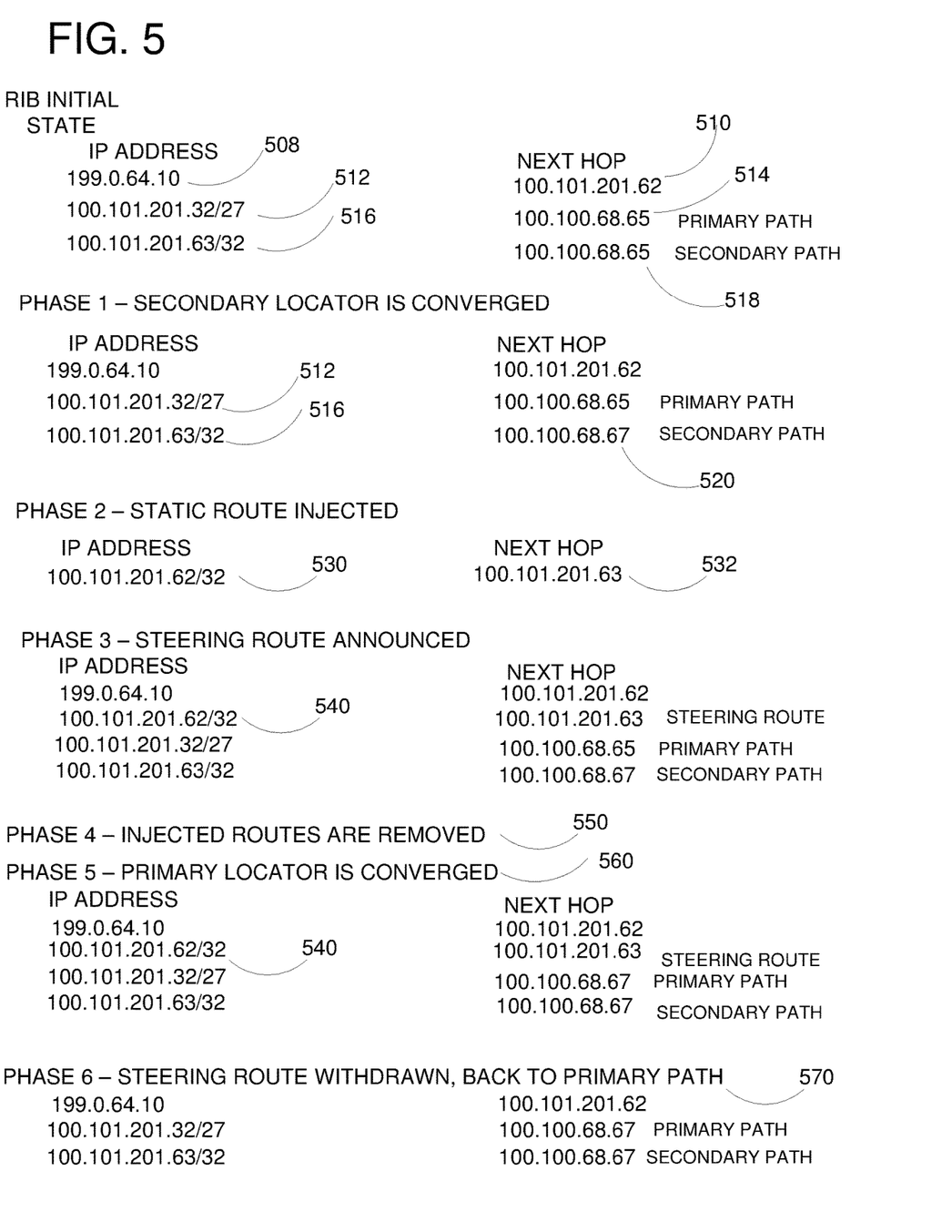
FIG. 5 shows an example entry in a Routing Information Base (RIB) as it changes through various phases of a path shift.

FIG. 4 is a flowchart according to one embodiment for changing paths in a network and is described in relation to a specific example in FIG. 5. In process block 410, for a prefix in a RIB (endpoint identifier), a fictitious next hop address (i.e., a non peer-to-peer address) is announced to be resolved by another route (locator) in the RIB indirectly. The announcement (made by routers in the network) can be broadcast to all other routers in the network. For example, in FIG. 5, an IP address 508 is associated with a fictitious next hop address 510, which is not a peer-to-peer address, but a pointer to a separate RIB entry. The pointing from one RIB entry to another is resolved recursively. In process block 420, a primary locator route is announced including a first prefix associated with the fictitious next hop address 510 and a next hop associated with the first prefix. For example, in FIG. 5, a primary locator route prefix 512 is a general prefix and the fictitious next hop 510 is within its range of addresses. In this sense, the fictitious next hop 510 recursively points to the primary locator route prefix 512. The primary locator route prefix 512 is associated with a peer-to-peer next hop address 514. The primary locator route is also announced to all routers in the region via the network routing protocol. In process block 430, a secondary locator route is announced to all routers in the region via the network routing protocol. The secondary locator route has a second prefix and a different next hop than the primary locator route. For example, in FIG. 5, a prefix 516 of the secondary locator route has a same next hop 518 as the primary locator route's next hop 514. Because the fictitious address is within the range of the prefix associated with the primary locator route, the secondary locator route is unused at this point in a first mode of operation. The first prefix 512 and the second prefix 516 can be outside of the peer-to-peer address range to be used only by fictitious prefixes inserted in the RIB for purposes of redirecting traffic, as described herein. However, it can be noted that the secondary locator route is shown with a more specific prefix 516 than the primary path's prefix 51, but other techniques can be used.

In process block 440, a path is determined that is to be removed from the network, and the primary locators associated with the path are identified. For example, in FIG. 1, the traffic shifting service 140 can determine that the path 130 needs to be removed. Other services or the routers themselves can determine that a router or path should be removed from the network. Accordingly, the traffic shifting service 140 can query the local shifting services in each data center 110, 112, 114, to identify the primary locator routes associated with the path. In process block 450, the secondary locator is allowed to converge to the residual alternative path throughout the network. As a result, the secondary locator route is updated with a next hop to redirect the network traffic. For example, in FIG. 5, a next hop 520 is updated to represent a different route than the primary locator route's next hop 514. As indicated in FIG. 5, this is a first phase of a process for redirecting network traffic.

In process block 458, for each primary locator route identified, a steering route is injected into the network devices to steer traffic associated with the fictious next hop address to the secondary locator routes. More particularly, the steering route includes a more specific prefix for the fictious next hop address. In FIG. 5, at 530, a prefix for the steering route includes a/32 prefix, which is an exact match for the fictitious next hop 510. Accordingly, instead of the next hop 510 resolving to the prefix 512 associated with the primary locator path, it resolves to the prefix 530, which has a fictitious next hop 532. The next hop 532 resolves to the prefix 516 associated with the secondary locator path. Thus, in a second phase and a second mode of operation, the IP address 508, through multiple levels of indirection, uses the next hop 520 of the secondary locator path. Such a shift in the next hop can cause redirection in the switch of an incoming packet. For example, in FIG. 3, a packet previously being directed to the primary port 380 is redirected to the secondary port 382. Such an injection can be performed by injecting the steering route into the static route 344 (FIG. 3) of the switching logic 326.

Additional steps can be performed for purposes of efficiency. In process block 460, the same steering route can be announced via the network routing protocol to make the steering route the primary route. For example, in FIG. 5, at 540, in a phase 3, the steering route is announced as an update to routers in the region. One benefit of such an announcement is that it lowers a dependency on the injected routes. Additionally, if the injected routes are limited to steering nodes (routers for which the primary and secondary paths diverge) then the traffic is still subject to the disruptive convergence dynamics of the network routing protocol, such as path-hunting, when the primary route is converged. Accordingly, the steering route is broadcast to avoid this issue in an efficient way. In process block 470, the injected static routes are removed. For example, in FIG. 5, a phase 4 is entered by removing the injected routes. Thus, the static routes 344 (FIG. 3) can be removed. In process block 480, the target path is removed from the network causing the primary-locator to converge to the residual alternative path throughout the network. As result primary-locator route is updated in the RIB. As can be seen in phase 5 of FIG. 5 at 560, the primary locator is converged and the secondary path and the primary path have a same next hop. Finally, at 490, the steering route is withdrawn from the RIB and the path shift is completed. For example, in FIG. 5, at 570, in a final phase 6, the steering route 540 is removed.

Figure 6:
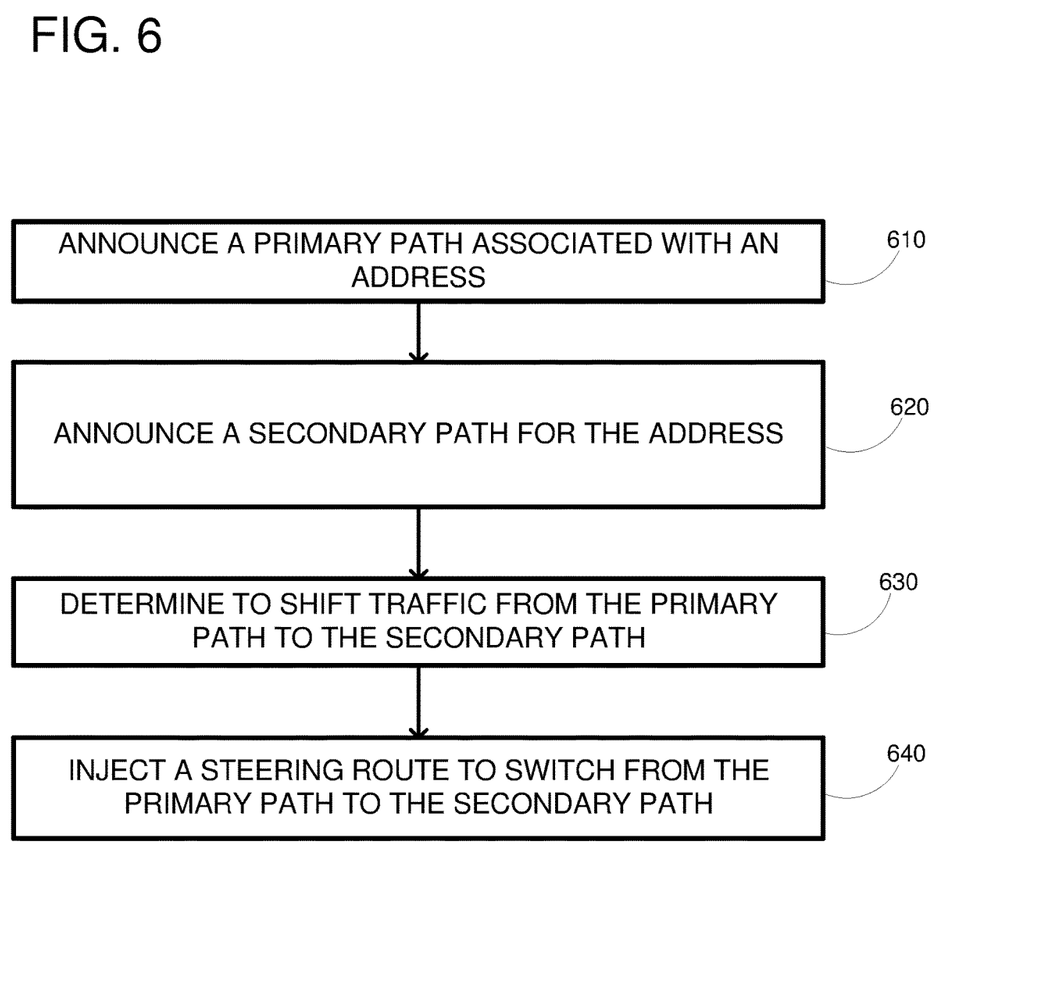
FIG. 6 is a flowchart according to another embodiment for shifting traffic away from a path.

FIG. 6 is a flowchart according to one embodiment. In process block 610, a primary path is announced associated with an address. For example, in FIG. 5, a primary path is formed by the prefix 512 and the next hop 514, which indirectly forwards packets associated with IP address 508 using the fictitious next hop 510. The announcement can be a network announcement to other network devices that communicate forwarding information through predetermined protocols. In process block 620, a secondary path is announced that is associated with the address. For example, in FIG. 5, the secondary path formed by the prefix 516 and next hop 518, is announced for use with the IP address 508, the same IP address as is used for the primary path. However, the secondary path is not yet in use. In process block 630, a determination is made to switch traffic from the primary path to the secondary path. For example, in a first mode of operation, the primary path can be used. However, a traffic shifting service, such as service 140 of FIG. 1, can determine that a path shift should occur for maintenance or other reasons. In process block 640, a steering route is injected to switch from the primary path to the secondary path. For example, in FIG. 5, the static route formed by prefix 530 and next hop 532 can be injected into the switching logic. The injection can also occur without using static routes, such as through network announcements.

Figure 7:
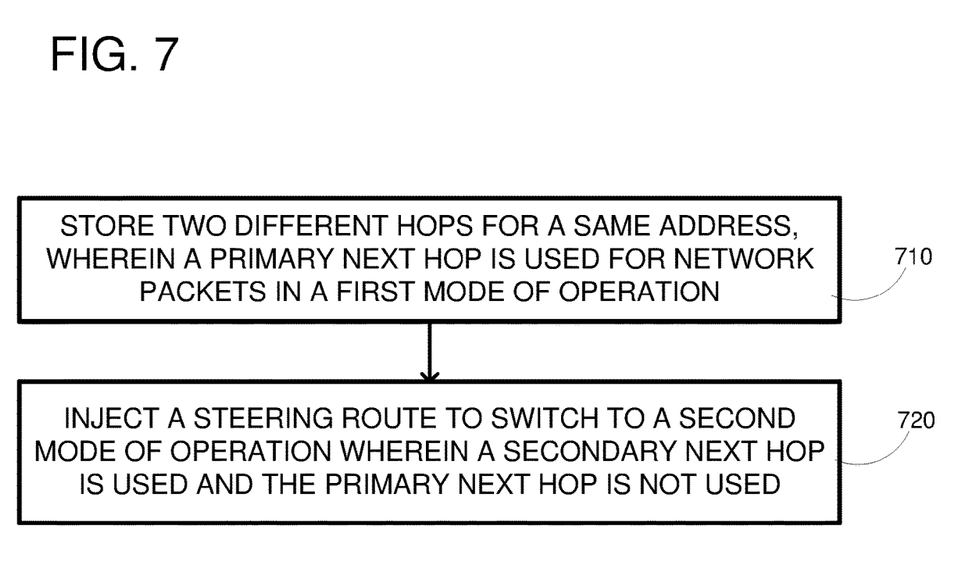
FIG. 7 is a flowchart according to yet another embodiment for shifting traffic away from a path.

FIG. 7 is a flowchart according to another embodiment. In process block 710, two different hops associated with a same address are stored in a RIB and/or FIB of a network device. In a first mode of operation, a primary next hop is used for network packets. For example, in FIG. 5, next hops 514, 518 are both stored in the RIB, but only the primary path and next hop 514 are used in the first mode of operation, due to the indirection of next hop 510 pointing to the primary path. In process block 720, a steering route is injected to switch to a second mode of operation wherein the secondary next hop is used and the primary next hop is not used. For example, in FIG. 5, the static route including prefix 530 and next hop 532 is indirectly pointed to by next hop 510. The next hop 532 of the steering route then points to the secondary path so that next hop 518 is used to switch the incoming packet.

Figure 8:
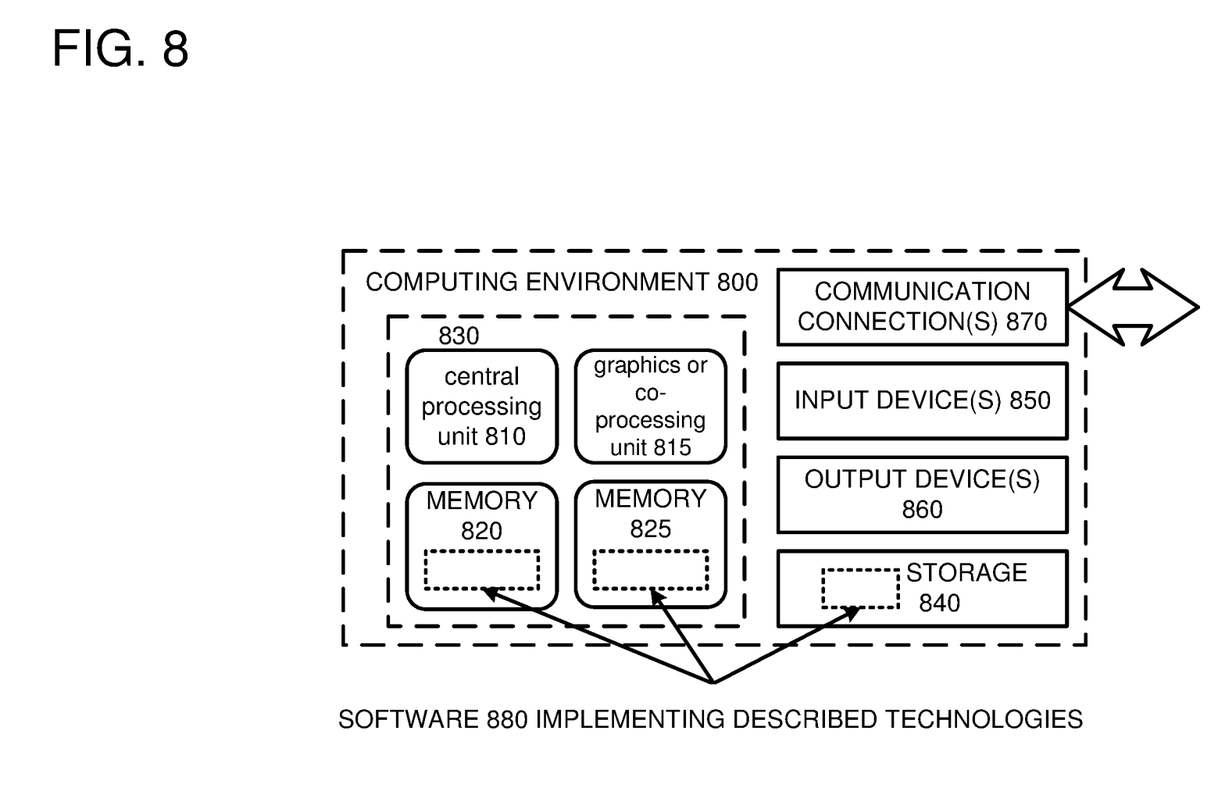
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). The computing environment 800 can be used for the traffic shifting service 140 (FIG. 1), for example.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of shifting traffic in a router in a network, the method comprising:
   announcing a primary path for a prefix to be directed to a first next hop in the network, wherein the primary path is stored in a Routing Information Base (RIB) of a network device;
   announcing a secondary path for the prefix to be directed to a second next hop, wherein the secondary path is an alternative path stored in the RIB for the same prefix, but wherein the secondary path is not used while the primary path is being used;
   determining to shift traffic away from the primary path to the secondary path; and
   injecting a steering route to switch from the primary path to the secondary path so that network traffic for the prefix is directed to the second next hop;
   wherein the primary path and the secondary path converge in the network before the injection of the steering route.

2. The method of claim 1, wherein the steering route is a static route that has priority over a Forwarding Information Base (FIB) in switching logic of the network device.

3. The method of claim 1, wherein the steering route is injected into the RIB.

4. The method of claim 1, wherein the primary path is directed to a first data center and the secondary path is directed to a second data center.

5. The method of claim 1, wherein the prefix is an Internet Protocol (IP) address and the network device is a switch.

6. The method of claim 1, further including receiving a packet having the prefix as part of a destination address and switching the packet to a port associated with the secondary path.

7. A method, comprising:
   in a network device, storing two different next hops for a same prefix, wherein a first next hop is a primary next hop and a second next hop is a secondary next hop, wherein in a first mode of operation, only the primary next hop is used for network packets received in the network device having the prefix as part of a destination address; and
   injecting a steering route into the network device to switch the network device to a second mode of operation wherein the secondary next hop is used for packets having the prefix as part of the destination address and the primary next hop is not used;
   wherein the network device is within a set of network devices having communication paths there between for establishing a network connection in the network; and
   wherein the primary next hop and the secondary next hop converge on the set of network devices before the injection of the steering route.

8. The method of claim 7, wherein the storing occurs in a Routing Information Base (RIB) of the network device.

9. The method of claim 7, wherein the injecting includes adding a static route into switching logic of the network device.

10. The method of claim 7, wherein each of the primary next hop and secondary next hop are associated with different ports on the network device.

11. The method of claim 7, wherein the primary next hop directs a received packet towards a first data center and the secondary next hop directs the received packet towards a second data center.

12. The method of claim 7, wherein the steering route is a pointer to a prefix associated with the secondary next hop.

13. The method of claim 7, wherein the primary next hop and the secondary next hop are associated with the prefix announced to multiple network devices so that the multiple network devices converge to forwarding paths that are consistent across the multiple network devices.

14. The method of claim 7, wherein the network device is a switch or a router.

15. A system, comprising:
   a set of network devices, wherein the set of network devices have communication paths there between for establishing a network connection in a network; and
   the set of network devices operable to perform the following:
      announce a primary route associated with a prefix to the set of network devices;
      announce a secondary route associated with the prefix to the set of network devices, wherein both the primary route and the secondary route are stored in Forwarding Information Bases (FIBs) of the set of network devices, and wherein, in a first mode of operation, the primary route is used for switching in the set of network devices and the secondary route is not used; and
      inject a steering route into the set of network devices to switch the set of network devices from using the primary route to using the secondary route, in a second mode of operation, wherein after the injection of the steering route, the primary route is not used.

16. The system of claim 15, wherein a first group of the set of network devices are within a first data center, and a second group of the set of network devices are within a second data center, and the primary route directly couples the first data center and second data center and the secondary route couples the first data center to the second data center via a third data center.

17. The system of claim 16, wherein the injecting of the steering route discontinues use of a network path between the first and second data centers.

18. The system of claim 15, wherein the injecting of the steering route includes changing a programming of a static route within switching logic of each of the set of network devices.

19. The system of claim 15, wherein the primary route and the secondary route converge on the set of network devices before the injection of the steering route.

20. One or more computer-readable media, which are non-transistory, comprising computer-executable instructions that, when executed, cause a computing system to perform a method comprising:
   in a network device, storing two different next hops for a same prefix simultaneously, wherein a first next hop is a primary next hop and a second next hop is a secondary next hop, wherein in a first mode of operation, only the primary next hop is used for network packets received in the network device having the prefix as part of a destination address; and
   injecting a steering route into the network device to switch the network device to a second mode of operation wherein the secondary next hop is used for packets having the prefix as part of the destination address and the primary next hop is not used, after the injection of the steering route.

* * * * *